United States Patent
Johnston

[11] 3,760,501
[45] Sept. 25, 1973

[54] EXTENSION TYPE HOLDER FOR FOOD HANDLING IMPLEMENTS

[76] Inventor: Leroy I. Johnston, R. R. 2, Lake Crystal, Minn. 56055

[22] Filed: Sept. 10, 1971

[21] Appl. No.: 179,410

[52] U.S. Cl............. 30/322, 30/334, 30/340, 294/55.5
[51] Int. Cl. ............................. A47j 43/28
[58] Field of Search ............ 7/1 A, 14; 30/1, 30/322, 323, 333, 334, 344, 366; 145/50 DB; 294/61, 50, 50.5, 55.5; 306/39, 40

[56] References Cited
UNITED STATES PATENTS
1,769,471   7/1930   Smith................................. 30/322
269,624   12/1882   Blake................................. 294/55.5

FOREIGN PATENTS OR APPLICATIONS
206,759   2/1909   Germany...................... 145/50 DB Primary Examiner—James L. Jones, Jr.
Assistant Examiner—Mark S. Bicks
Attorney—Clarence A. O'Brien et al.

[57] ABSTRACT

For use at a picnic area, campsite, or backyard cookout, a safeguarding extension-type holder for weiner and marshmallow impaling forks, prepackaged popcorn and similar wire handled implements comprising an elongated handle having an implement mounting and clamping adapter at one end and a convenient handgrip at its other end. The adapter comprises a channel-shaped open-ended base plate and a companion clamping plate bolted atop the base plate in a manner that a U-shaped end portion of the wire implement can be sandwiched in place and clampingly held.

2 Claims, 4 Drawing Figures

PATENTED SEP 25 1973          3,760,501
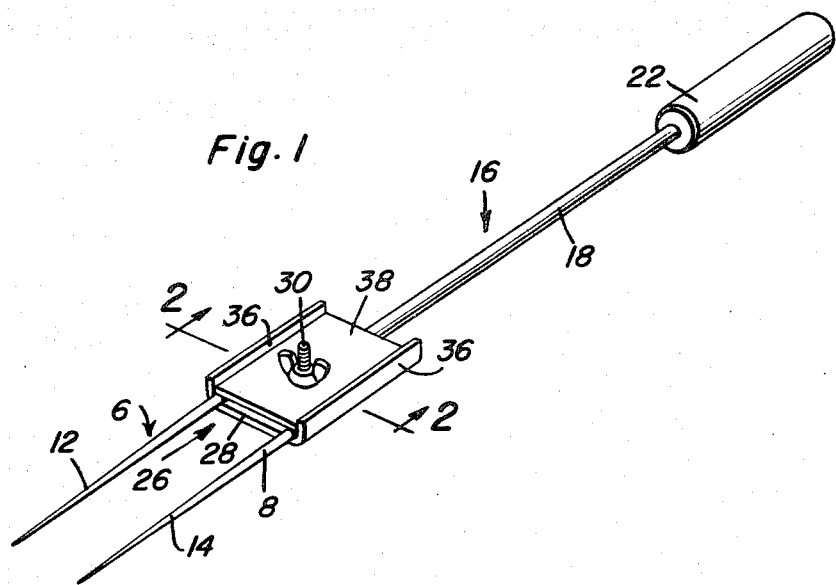
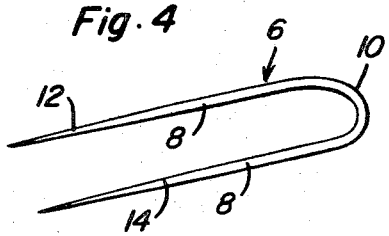
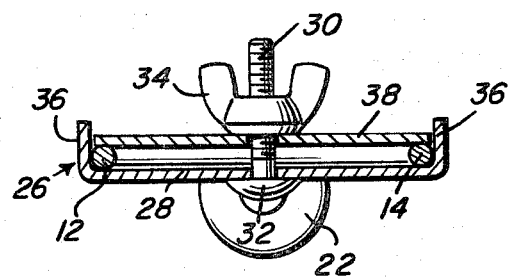
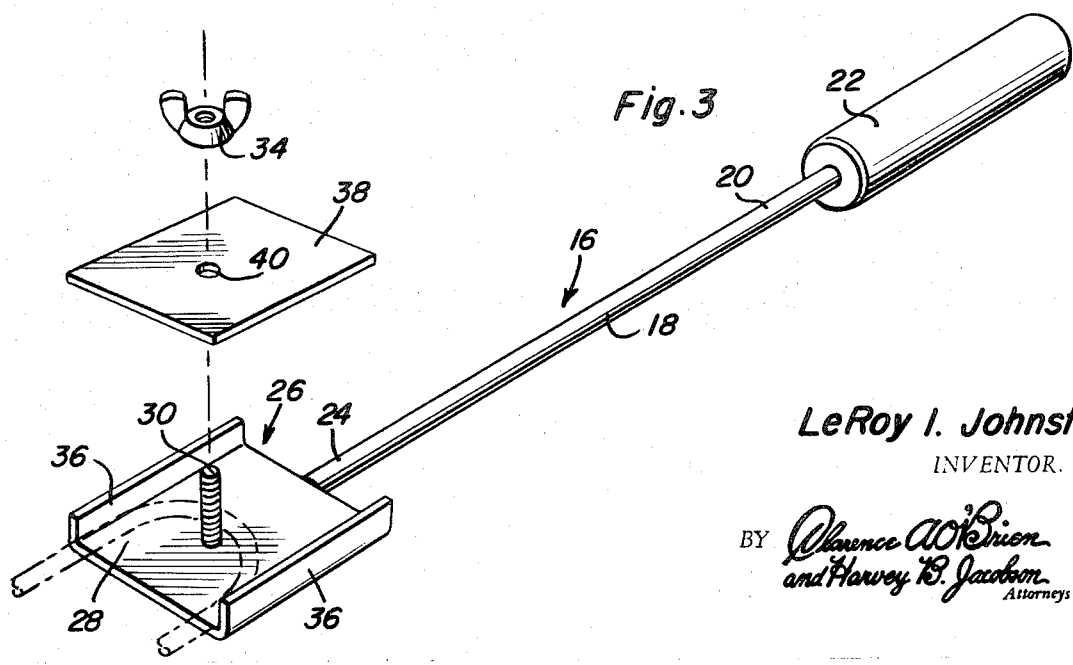
LeRoy I. Johnston
INVENTOR.
BY Clarence A. O'Brien
and Harvey B. Jacobson
Attorneys

EXTENSION TYPE HOLDER FOR FOOD HANDLING IMPLEMENTS

This invention relates to an implement holder, more particularly, an adaptation wherein an elongated reach rod functions as a shank or handle, has a handgrip at one end and adapter means at its other end, the adapter means serving to accommodate an end portion of a wire or equivalent fork or similar implement such as is commonly used to impale and safely hold a food product, a frankfurter or marshmallows for example, while it is being cooked over a suitable fire either indoors or outdoors as the case may be.

Implements such as those herein under consideration are of many and varied styles and types but are often and most frequently referred to as forks long-handled. Most of the implements commonly used are fashioned from suitably bent and twisted wire and have pointed tines at one end and an elongated looped type or equivalent handle or handgrip at the other end. One such implement, classified as a collapsible fork, is shown in a U.S. Pat. to Benjamin H. Smith, No. 1,768,425. Another exemplary fork or implement is shown in Robert K. Hallum, U.S. Pat. No. 2,404,495. Other implements on the market which are also generally made from a length of bent or twisted wire having looped and U-shaped end portions and although many such implements are of extended or appropriate length for ordinary food impaling and cooking purposes, there are instances where one finds it advisable to use an extension holder and, in so doing, to more satisfactorily safeguard the user of the implement.

As is perhaps evident from the preceding comments, it is an object of the present invention to provide what is believed to be an unique and practical holder which constitutes an extended handle, has an appropriate handgrip at one end and a clamping implement adapter at its other end.

Briefly, the concept has to do with the combination of the extension-type holder and the coordinating orientation therewith of a U-shaped or an equivalent fork or similar implement. More particularly, novelty is predicated on the holder itself, that is, a holder for a U-shaped end portion of a readily attachable, detachable, and retractable bent wire food impaling fork or similar campsite or cookout implement. The holder comprises an elongated reach rod which constitutes a handling shank. A handgrip is fixed on one end and an implement adapter is carried by the other end, the adapter being such that it lends itself to satisfactory accommodation and retention of the U-shaped or equivalent end portion of the attachable and detachable implement.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of the holder and implement combination assembled and readied for use.

FIG. 2 is an enlarged cross-section with parts in elevation taken on the section line 2—2 of FIG. 1 looking in the direction of the indicating arrows.

FIG. 3 is a view on a suitably enlarged scale of the holder by itself with the component parts exploded to illustrate the construction and applicable use thereof.

FIG. 4 is a view in perspective of a typical U-shaped food impaling fork which is representative here of the implement or implements under consideration.

The holder is of a multipurpose character and lends itself to feasible use in conjunction with various types of fork-type implements. It may be stated in this connection that there are certain pre-packaged pan-type popcorn units on the market which use U-shaped or loop-type handles with which the herein disclosed holder can also be used. It seems appropriate however to simply refer to the implement as a fork, for example the adaptation shown in FIG. 4 and which is denoted by the numeral 6 and is U-shaped in plan and comprises spaced parallel legs or limbs 8 joined by an arcuate bight portion 10. The legs are pointed to provide impaling tines 12 and 14.

The holder shown in the other views and particularly in FIG. 3 lends itself to ready use in connection with a fork or similar implement as shown.

The holder is denoted by the numeral 16 in FIG. 3 and comprises an elongated rigid round stock reach rod 18 which is of a length to provide an appropriate handle or shank. One end portion 20 is provided with an appropriate wooden or equivalent handgrip 22. The other end portion is denoted at 24 and is provided with an implement adapter. The adapter preferably comprises a main head portion which is denoted generally at 26 and is characterized by a flat-faced plate 28 provided at its center with a bolt hole to accommodate the threaded shank 30 of a headed or equivalent bolt 32 (FIG. 2), said bolt in practice being provided with a wing nut or the like as denoted at 34 in FIG. 2. It is within the purview of the invention to employ a rigid stud with a nut if desired. In any event, the opposed marginal edges are provided with spaced parallel upstanding corresponding retaining flanges 36. The plate and the flanges provide an open-ended channel-shaped adapter which serves to accommodate the attachable and detachable clamping or top plate, denoted at 38. This plate 38 fits with requisite nicety between the flanges when in use as shown in FIGS. 1 and 2. It has a central hole 40 to accommodate the projecting stud or bolt.

In actual practice it will be evident that these two plates 28 and 38 provide a satisfactory adapter for the U-shaped end portion 10 of the fork 6 or equivalent implement (not shown). This is to say, the U-shaped member is seated atop the plate 28 as shown in phantom lines in FIG. 3. The clamping plate is applied and secured in place thus holding the fork steady and making the same a complemental part of the holder as is evident from the views of the drawing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An extension-type holder for a readily attachable and detachable food impaling fork, pre-packaged popcorn, or a wire handle-equipped food cooking attachment comprising an elongated reach rod of requisite length constituting an implement handling and supporting shank, said rod having first and second ends, an insulated handgrip fixed to said first end, an implement adapter cooperable with said second end, said adapter comprising a base plate provided along two opposed lengthwise marginal edges with outstanding spaced parallel assembling and retaining flanges, said flanges in conjunction with the intervening plate providng a channel-shaped adapter, said adapter being unobstructedly open at forward and rearward ends, and an implement positioning and clamping plate superimposed upon a cooperating surface of said base plate and of a length commensurate with the length of said base plate and of a prescribed width that it is retentively confined but removably mounted between coordinating inner surfaces of the respective flanges, and bolt and nut plate assembling and clamping means cooperatively associated with and carried by coordinating centralized portions of said plate.

2. The extension holder defined in claim 1, and, in combination, a rigid self-contained U-shaped food impaling and cooking fork embodying a pair of like coplanar tines having like ends integrally joined by a coordinating U-bend, and having free pointed ends, said fork being of a length greater than the length of said adapter, the distance between the flanges being equal to the width of said fork, said tines paralleling and firmly abutting the respective interior surfaces of said flanges, said fork being retractable in a direction toward said handgrip in a manner that it is capable of overlying that portion of the shank adjacent to the rearward open end of the adapter and said plate being adapted to protectively overlie the pointed ends when the fork is in the safety retracted out-of-use position.

* * * * *